United States Patent [19]

Hinton

[11] 4,185,061

[45] Jan. 22, 1980

[54] PRODUCTION OF CERAMIC ARTICLES

[75] Inventor: Jonathan W. Hinton, Birmingham, Mich.

[73] Assignee: Champion Spark Plug Company, Toledo, Ohio

[21] Appl. No.: 926,012

[22] Filed: Jul. 19, 1978

[51] Int. Cl.[2] .............................................. C04B 35/56

[52] U.S. Cl. ........................................ 264/65; 264/67; 264/332

[58] Field of Search ........................ 264/56, 60, 65, 66, 264/332, 104, 67

[56] References Cited

U.S. PATENT DOCUMENTS

| | | | |
|---|---|---|---|
| 2,027,786 | 1/1936 | Ridgway et al. | 264/332 |
| 3,258,514 | 6/1966 | Roach | 264/332 |
| 3,264,380 | 8/1966 | Parsons | 264/332 |
| 3,599,281 | 8/1971 | Boyer | 264/332 |
| 3,989,438 | 11/1976 | Smith et al. | 264/332 |

*Primary Examiner*—Donald J. Arnold
*Attorney, Agent, or Firm*—John C. Purdue

[57] ABSTRACT

An improved method for producing a ceramic insulator is disclosed. The method comprises the steps of charging ceramic batch into a longitudinally extending die in which stepped arbors are supported by a plunger, forming a blank by pressing the batch between the arbor plunger and an opposing plunger, ejecting the blank and removing the arbors therefrom, contouring the blank to a desired shape, and firing the contoured blank. The insulator has a length-to-diameter ratio greater than 3:1 but not greater than 8:1; the improvement constitutes controlling the relative movements of the opposing plungers with respect to the longitudinal wall of the die during pressing of the blank so that at least 80 percent of the total plunger movement is in the direction of decreasing arbor diameter whereby variations in the end-to-end density of the insulator are minimized. Where 80 percent to 90 percent of the plunger movement is in the recited direction, a further improvement involves contouring the longitudinal surface of the blank to form generally a solid of revolution about the longitudinal axis of the blank wherein the diameter of the blank is greater than the desired fired diameter by a percentage which varies as an inverse function of the end-to-end density of the blank in order to achieve the desired longitudinal surface contour for the fired blank.

4 Claims, 8 Drawing Figures

A ———— TWO STEPPED ARBORS, SINGLE-ACTION COMPACTION, IN DIRECTION OF DECREASING ARBOR DIAMETER.

B – – – – – – NO ARBOR, DOUBLE-ACTION COMPACTION, PRESSED EQUALLY FROM BOTH ENDS.

C —·—·—·— TWO STEPPED ARBORS, DOUBLE-ACTION COMPACTION, PRESSED EQUALLY FROM BOTH ENDS.

PRODUCTION OF CERAMIC ARTICLES

BACKGROUND OF THE INVENTION

Ceramic insulators have been produced by charging a powdered batch into a longitudinally extending die, compressing the powder into a blank, and firing the blank to a suitable temperature. Bores extending generally longitudinally of the blank can be formed by arbors positioned within the die. After the pressing operation the blank should be of substantially uniform density throughout. Because the powder does not flow like liquid, offering considerable internal resistance to flow, it is seldom possible to obtain completely uniform density by the pressing method described; it is particularly difficult, if not impossible, to achieve the requisite degree of density when the ratio of the length of the insulator to the diameter thereof exceeds about 3:1.

Insulators have been made by single-action pressing, using a single plunger to compress the batch in a die having a closed bottom. Single-action pressing causes maximum density near the plunger and variations in density as an inverse function of the distance from the end of the plunger. Double-action pressing, i.e., compaction of the batch between top and bottom plungers, both of which are moved, is preferred because it leads to a more nearly uniform end-to end density, variations being generally parabolic between maximums at two ends, with a minimum near the center.

Floating-die pressing, where a die "floats" between two plungers, one on each side of a charge of a ceramic batch in the die, makes double-action compacting possible in a single-action press. As pressure is applied by a single upper or lower plunger, friction builds between the compacting material and the die wall causing the die to move. Movement of the die over the stationary plunger compacts the material in the adjacent die region just as if the die wall were stationary and the plunger were moving. This floating die technique can be used in lieu of a fixed die and two moving plungers to produce essentially double-action compaction. After pressing by any of the methods hereinbefore described, the blank is ejected from the die and any arbor that may have been used to form a bore therein, is removed therefrom.

Because of the requirement for uniform end-to-end density of the blank, both floating-die and double-action pressing have certain production limitations; the instant invention overcomes two of these limitations. First, because the magnitude of variations in end-to-end density is a function of both length and the width of a part being pressed, it has heretofore been necessary to keep the length-to-diameter ratio of the blank low, preferably below 2:1, and certainly not greater than 3:1. Such restraint on the indicated ratio is necessary because firing of the blank causes shrinkage to occur; the magnitude of the shrinkage varies as an inverse function of the end-to-end density of the blank. If the end-to-end diametral shrinkage variations of the fired blank exceed 1 percent, as has heretofore occurred when the length-to-diameter ratio approached 3:1, the blank is unusable. Second, the addition of a plurality of bores extending generally longitudinally of the insulator, especially if the bores are stepped, causes irregular density gradients which may cause the pressed blank to crack.

Because of the above-mentioned limitations on the use of dies to press unfired shapes or blanks from ceramic batch material, blanks for spark plug insulators and for other ceramic shapes having a length-to-diameter ratio exceeding 3:1 are usually pressed by a technique that has come to be known as "isostatic pressing". This method, as well as apparatus in which it can be practiced, is disclosed in detail in U.S. Pat. No. 2,152,738 granted Apr. 4, 1939 to Jeffery. Isostatic pressing produces blanks of substantially uniform density, even though the length-to-diameter ratio exceeds 3:1. It is not, however, capable of producing blanks having the relatively complex exterior and interior shapes, e.g. plural bores, desired in modern spark plug insulators; similarly, it is not capable of producing blanks having the dimensional accuracy required in such insulators. These difficulties are usually overcome by grinding the blank, after it has been formed by isostatic pressing, to the desired unfired shape. This is frequently done by bringing the blank into contact with an accurately contoured grinding wheel, and rotating the blank around a spindle on which it is mounted while it is being dressed by the contoured grinding wheel.

BRIEF DESCRIPTION OF THE INVENTION

The instant invention is based upon the discovery of a method which involves pressing in a suitable die to produce a ceramic insulator wherein the length-to-diameter ratio is greater than 3:1 and wherein the insulator can have at least two stepped bores extending longitudinally therein. The complex density gradients caused by the addition of the bores extending generally longitudinally of the insulator are eliminated by controlling the relative movements of the opposing plungers with respect to the longitudinal wall of the die while pressing the blank so that at least 80 percent of the total plunger movement is in the direction of decreasing arbor diameter. This plunger movement can be accomplished by the floating-die or double-action pressing technique. The end-to-end diametral shrinkage variations caused by firing can be minimized to within acceptable limits by causing substantially all of the plunger movement to be in the direction of decreasing arbor diameter. Also, these variations can be virtually eliminated when from 80 to 90 percent of total plunger movement is in the direction of decreasing arbor diameter by contouring the longitudinal surface of the blank generally as a solid of revolution about its longitudinal axis prior to firing, and controlling the diameter of the blank so that it is greater than that desired after firing by a percentage which varies as an inverse function of the green, or unfired density. For example, when the end-to-end density variations of the blank are generally parabolic diminishing from each end to the center of the blank, a fired shape having the desired contour can be produced if the blank, before firing, is contoured to a shape where the diameter is greater than the desired fired diameter by a percentage which increases from a minimum at each end of the blank to a maximum at the middle. Such a method can be used for ceramic insulators having a length-to-diameter ratio as high as 8:1.

OBJECTS OF THE INVENTION

It is an object of the invention to provide an improved method for producing a ceramic insulator.

(a) two stepped bores extending longitudinally therein, the blanks from which the insulator was produced being formed by single-action compaction in the direction of decreasing arbor diameter;

(b) no bore, the blank from which the insulator was produced being formed by double-action compaction pressed equally from both ends; and (c) two stepped bores extending longitudinally therein, the blank from which the insulator was produced being formed by double-action compaction pressed equally from both ends.

Figure 6:
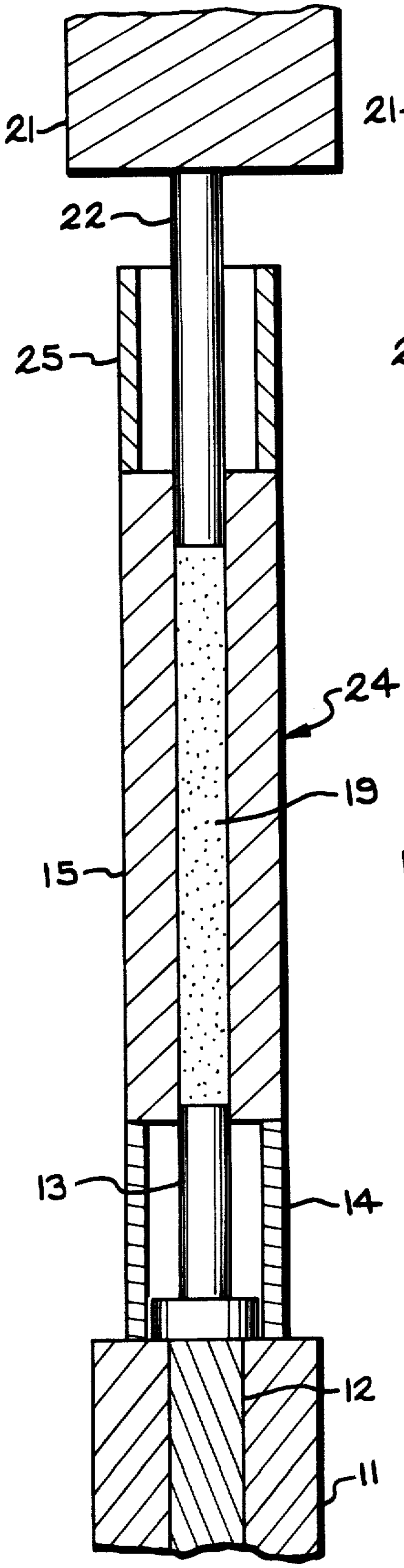

FIG. 6 is a partially schematic, vertical sectional view showing apparatus in which blanks can be pressed via double-action pressing in practicing the invention; the apparatus, as shown in FIG. 6, is in its initial position, charged with ceramic batch to be compacted, but prior to compaction.

Figure 7:
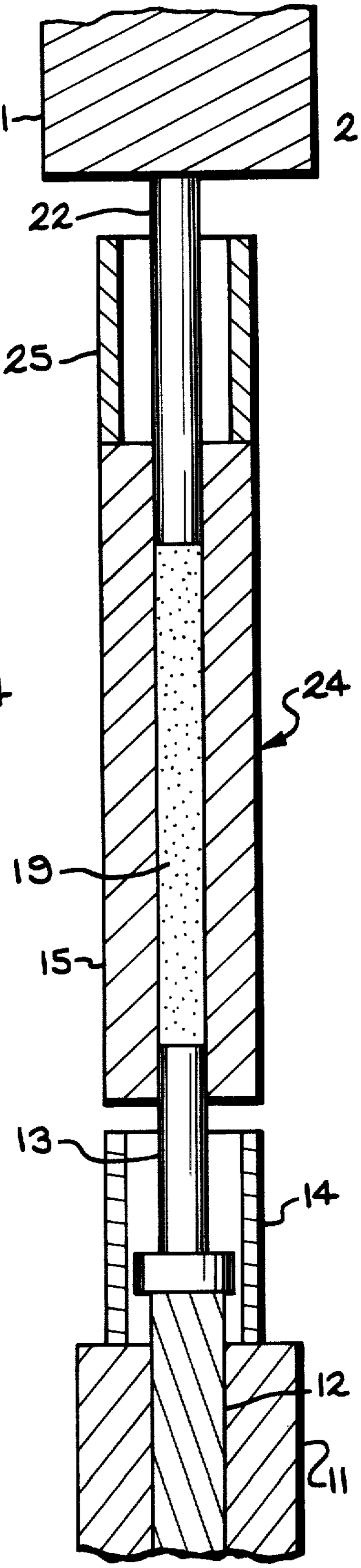

FIG. 7 is a sectional view showing the apparatus of FIG. 6 after compaction has commenced.

Figure 8:
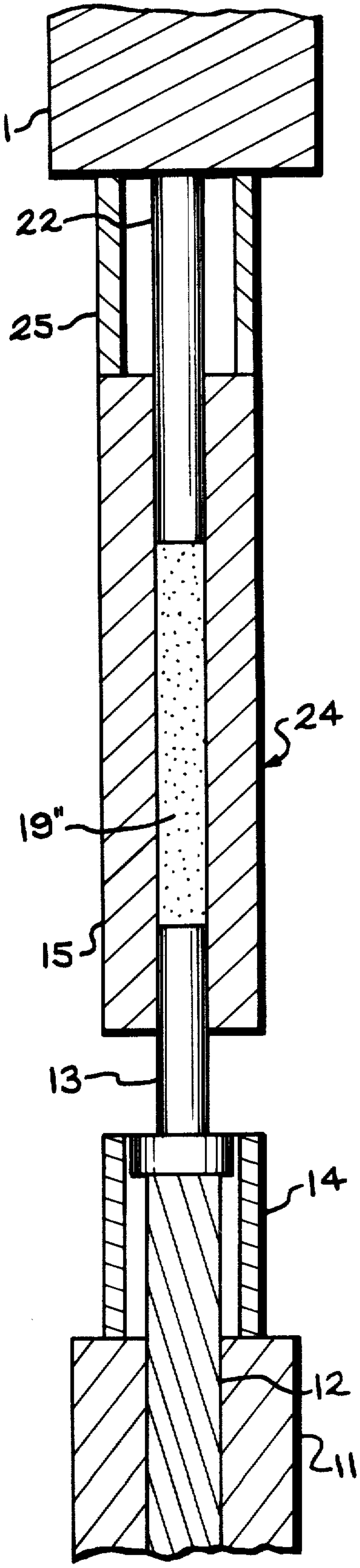

FIG. 8 is a sectional view showing the apparatus of FIG. 6 after compaction has been completed.

DETAILED DESCRIPTION OF THE INVENTION

Figure 1:
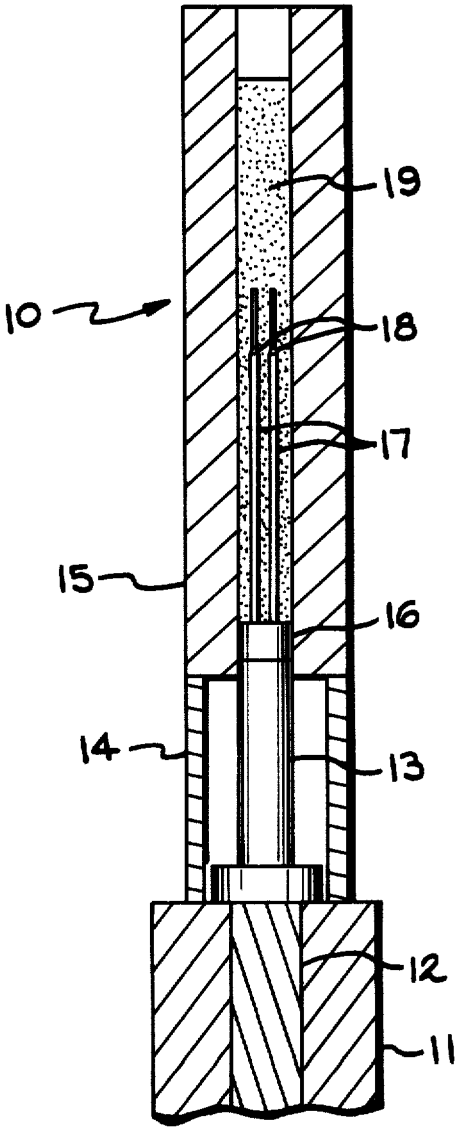
FIG. 1 is a partially schematic, vertical sectional view showing a mold into which batch has been charged.

Referring to FIG. 1, a schematically represented mold assembly indicated generally at 10 is positioned on a lower press platen 11 through which extends a hydraulic piston 12 which has an integral plunger 13 that extends through a cylindrical shell spacer 14. The upper end of the plunger closes the lower end of a die 15 of the assembly 10. The die 15 rests upon the spacer 14 which in turn rests on the upper surface of the lower press platen 11. The assembly 10 also includes an arbor guide 16 which rests on the upper surface of the plunger 13 and carries two arbors 17 each of which extends upwardly and longitudinally of the die 15 and each of which has a shoulder 18 between a larger diameter, lower end positioned in the arbor guide 16 and a smaller diameter upper end. The interior of the die 15 is filled with ceramic batch 19 which rests upon the upper surface of the arbor guide 16 and surrounds the arbors 17. The mold assembly 10, in FIG. 1, is in its charged state, ready for single-action pressing.

Figure 2:
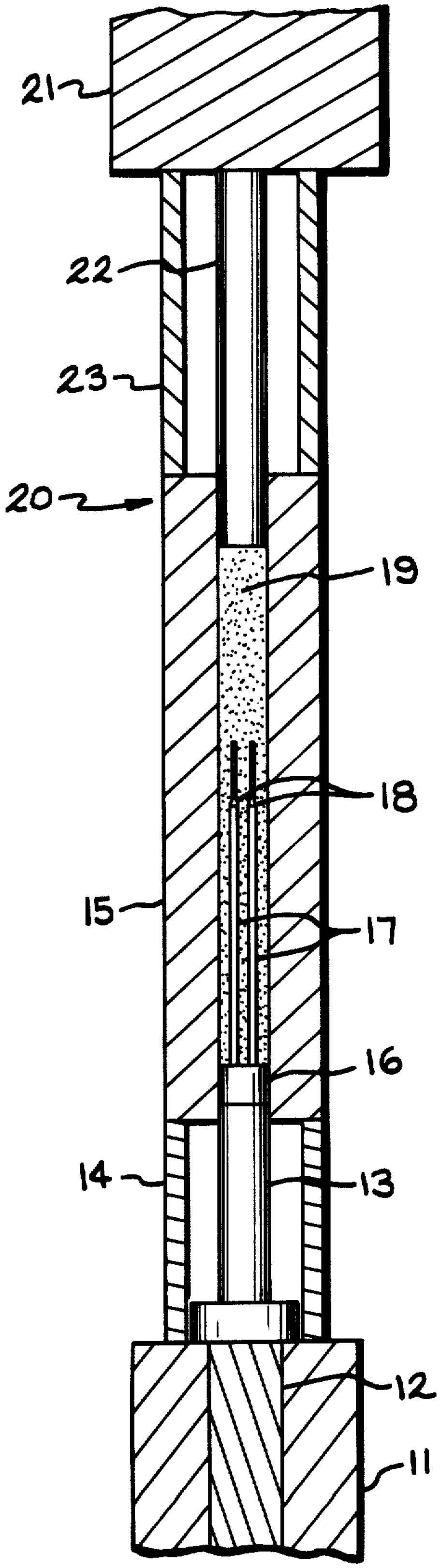
FIG. 2 is a sectional view showing the mold of FIG. 1 and additional apparatus in which blanks can be pressed via single-action pressing in practicing the invention; the apparatus as shown in FIG. 2, is in its initial position, charged with ceramic batch to be compacted, but prior to compaction.

Referring to FIG. 2, a schematically represented assembly indicated generally at 20 comprises the mold assembly 10 and an upper press platen 21 which has an integral plunger 22 that extends through a cylindrical shell spacer 23 and into the cavity of the die 15 in contact with the ceramic batch 19 therein. The plunger 22 is shown positioned in the cavity of the die 15 so that the spacer 23 is butted between the die 15 and the lower surface of the upper press platen 21. The cavity of the die 15 and the spacer 23 are so sized relative to the volume of the ceramic batch charge 19 that compaction of the ceramic batch 19 is not commenced when the plunger 22 is in the position just described. The press of the assembly 20 in FIG. 2 is in its initial position, just prior to the beginning of single-action compaction.

Figure 3:
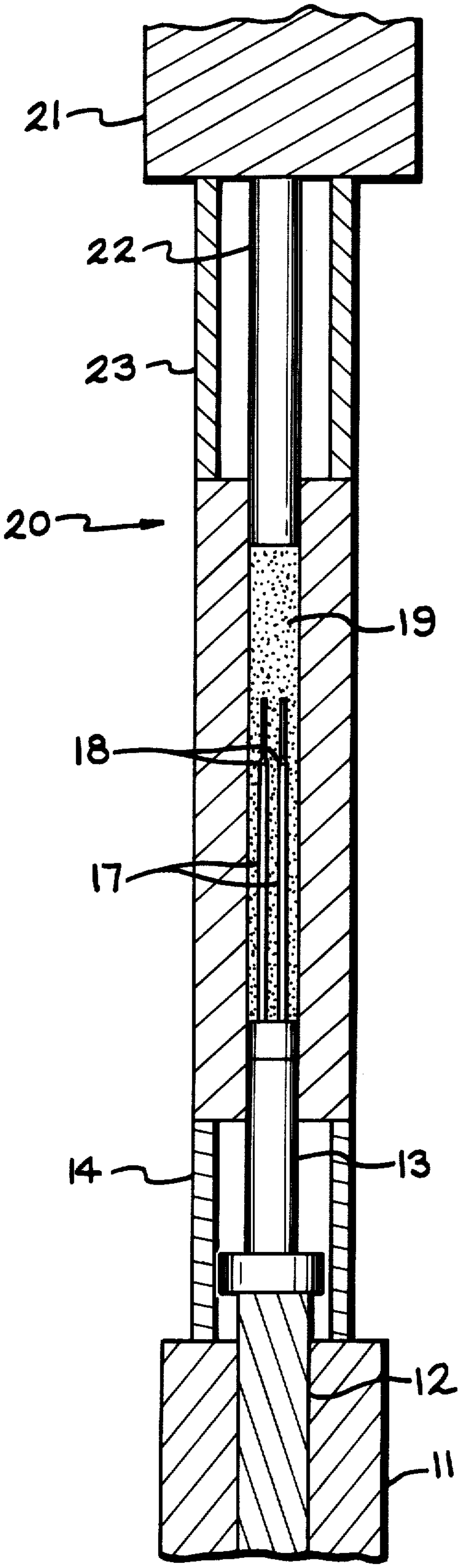
FIG. 3 is a sectional view showing the apparatus of FIG. 2 after compaction has commenced.
Figure 4:
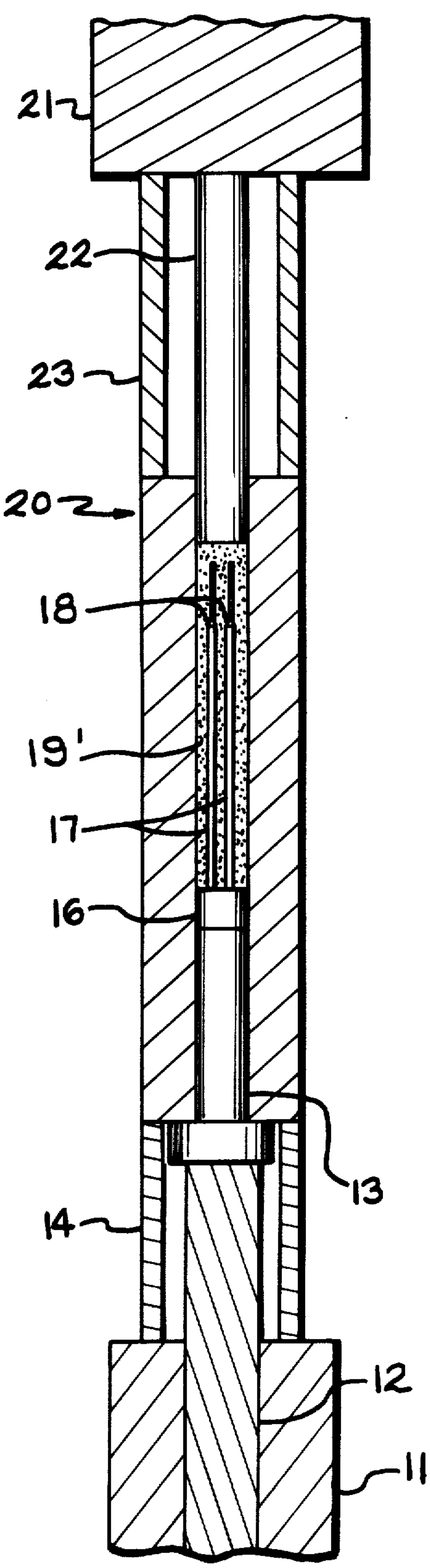
FIG. 4 is a sectional view showing the apparatus of FIG. 2 after further compaction and, specifically, when single-action pressing has been completed.
Figure 5:
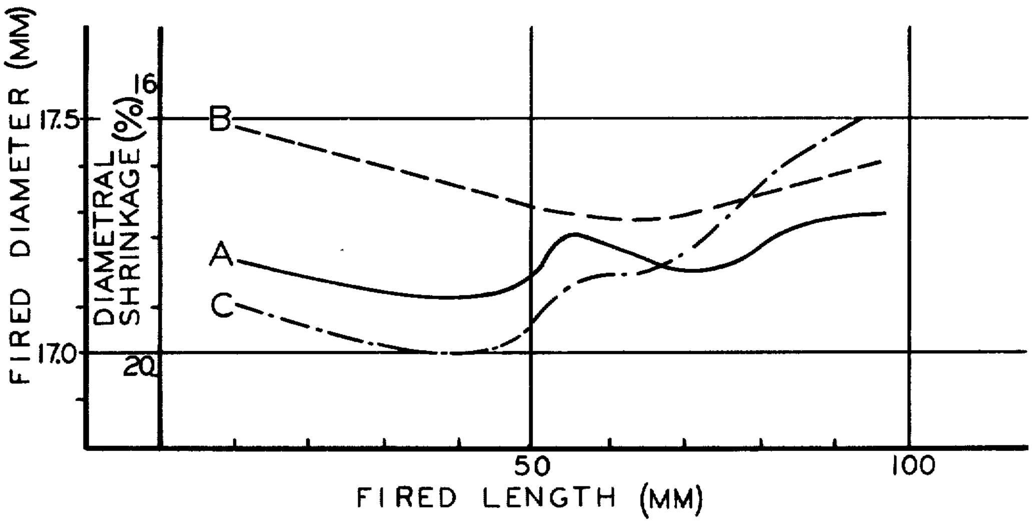
FIG. 5 is a set of three curves showing fired diameter and end-to-end diametral shrinkage of a fired ceramic insulator which had.

The progression of the single-action compaction process according to the invention is shown in FIGS. 3 and 4. Hydraulic pressure is applied to force the piston 12, its integral plunger 13 and the arbor guide 16 to move upwardly through the position in FIG. 3 to that of FIG. 4, thereby compacting the ceramic batch 19. If the arbors 17 were not positioned within the die 15, such single-action pressing would cause maximum density of the ceramic batch 19 near the arbor guide 16 and variations in batch density as an inverse function of the distance from the end of the arbor guide 16. However, the presence of the arbors 17 within the die 15 creates irregular density gradients which can be held to acceptable limits by causing plunger movement in the direction of decreasing arbor diameter. As illustrated in FIG. 4 the upward advancement of the plunger 13 is halted when the ceramic batch 19 has been fully compacted to form a ceramic blank 19′ which is then ejected from the die 15 and separated from the arbors 17. Firing of the blank 19′ causes shrinkage to occur, the magnitude of which, longitudinally of the blank after firing, varies as an inverse function of the end-to-end density of the blank. End-to-end diametral shrinkage variations during firing of 1 percent or greater render the blank 19′ unusable; shrinkage of such magnitude has heretofore occurred when the length-to-diameter ratio of a blank pressed in a die approaches 3:1. When the ceramic blank 19′, which had a length-to-diameter ratio of substantially 6½:1 and two stepped bores extending longitudinally therein was fired to maturation, the diametral shrinkage variations (Curve A, FIG. 5) did not exceed 1 percent.

Double-action pressing, i.e., compaction of ceramic batch between top and bottom plungers, both of which are moved, is preferred when there are no obstructions, e.g., stepped arbors, to batch flow because it leads to more nearly regular variations in end-to-end density, the variations being generally parabolic between maximums at the two ends, with a minimum near the center. Such pressing can be accomplished by a floating die technique in apparatus indicated generally at 24, FIGS. 6 through 8. The apparatus 24 is similar to that designated 20, FIGS. 2–4, except that the arbors 17 and the arbor guide 16 have been omitted, and the shell spacer 23 has been replaced by shorter, but otherwise similar spacer 25. In FIGS. 6–8, portions of the apparatus 24 which are the same as the corresponding portions of the apparatus 20 of FIGS. 2–4 are designated by like reference numerals.

Referring to FIG. 6, in the schematically represented apparatus 24 the top plunger 22 is positioned in the cavity of the die 15 so that the distance between the upper surface of a spacer 25 and the lower surface of the upper press platen 21 is substantially equal to 50 percent of the total projected movement of the bottom plunger 13. The cavity of the die 15 and the spacer 25 are so sized relative to the quantity of the ceramic batch 19 charged, that compaction has not commenced when the plunger 22 is in the position just described. The apparatus 24 in FIG. 6 is in its initial position, just prior to the beginning of double-action compaction.

As hydraulic pressure is applied to force the piston 12 and its integral plunger 13 upward, friction builds between the ceramic batch 19 and the wall of the die 15 causing the die 15 to rise from the upper surface of the die spacer 14, by a distance equal to approximately one-half the movement of the bottom plunger 13.

Movement of the die 15 over the stationary top plunger 22 compacts the material in the adjacent die region just as if the wall of the die 15 were stationary and the plunger 22 were moving a distance equal to approximately one-half the movement of the bottom plunger 13. Similarly, the greater movement of the plunger 13 within the die 15 compacts the material in the adjacent die region just as if the wall of the die 15 were stationary and the plunger 13 were moving a distance equal to approximately one-half its actual upward movement. Hence, the ceramic batch 19 is subjected to equal compaction between the top plunger 22 and the bottom plunger 13 until the spacer 25 is forced into contact with the lower surface of the upper press platen 21 and the die 15 as illustrated in FIG. 8, at which time the upward movement of the bottom plunger 13 is halted because compaction has been completed and the ceramic blank 19" has been formed. The blank 19" is then ejected from the die 15. The apparatus 24 is shown in FIG. 7 at an intermediate stage in the pressing operation just described.

As mentioned above, the end-to-end density variations of the ceramic blank 19" vary as a generally parabolic function with a minimum at about the center between maxima at the two ends. Since the length-to-diameter ratio is greater than 3:1, firing of the blank 19" would cause diametral shrinkage variation in excess of 1 percent. Variations in the diameter of the fired ceramic can be virtually eliminated by contouring the blank 19" before firing to a shape where the diameter is greater than the desired diameter by a percentage which increases from a minimum at each end of the blank 19" to a maximum at about the middle. Such a method can virtually eliminate end-to-end diametral shrinkage variation caused by firing. This method can be understood by reference to Curve B, FIG. 5, which is a plot of fired diameter and diametral shrinkage against fired length for a cylindrical blank pressed as described above in connection with FIGS. 6–8 from a ceramic batch containing about 90 percent of alumina, remainder principally silica, calcia and magnesia. The unfired blank had a diameter of about 21 millimeters and a length of about 120 millimeters. After firing to maturity, the ceramic article had a diameter varying from about 17.5 millimeters to about 17.3 millimeters, indicating a shrinkage ranging from about 16.4 percent at each end to about 17.8 percent near its center. These relationships are plotted as Curve B, FIG. 5. To produce a ceramic article having a desired shape by the contouring method of the present invention, a cylindrical body of the batch from which the article is to be produced can be pressed as described above in connection with FIGS. 6–8, and the pressed blank can then be fired to maturation to enable determinations of the type plotted in FIG. 5, Curve B. A new blank can then be pressed by the same method, and contoured so that its exterior surface is a surface of revolution having a diameter in any given transverse section greater than the desired fired diameter for that section by a percentage which varies from transverse section to transverse section as an inverse function of variations in pressed density. For example, if a fired diameter of 17.5 millimeters is desired at a particular transverse section, and if the density of that section is sufficiently low that a diametral shrinkage of 17 percent will occur, that particular section should be contoured to a green diameter of substantially 21.1 millimeters (17.5/0.83). On the other hand, if a fired diameter of 17.5 millimeters is desired at a different transverse section, but the density is such that the shrinkage at that section will be 16.5 percent, the green body, at that section, should be contoured to a diameter of 21.0 millimeters (17.5/0.835) while, at a transverse section where a fired diameter of 17.5 millimeters is desired, but the density is sufficiently low that a diametral shrinkage of 17.8 percent will occur, the unfired blank should be contoured to a diameter of 21.3 millimeters (17.5/0.822) at that section.

When the double-action pressing method described above in connection with FIGS. 6–8 was practiced in a mold containing the stepped arbors 17 (FIGS. 1-4) extending generally longitudinally within the die 15 irregular variations in density were encountered although an idealized generally parabolic curve can be plotted based upon the actual data. The irregularities took the form of lower firing shrinkage in the vicinity of the steps and of the ends of the arbors, and the ceramic blanks were consistently cracked. However, when the total plunger movement is in the direction of decreasing arbor diameter, as described above in connection with FIGS. 1–4, diametral shrinkage variations in excess of 1 percent are eliminated as indicated by Curve A of FIG. 5, as is cracking of the ceramic blanks.

It will be appreciated that the contouring technique described above with reference to the blank 19" produced as described in connection with FIGS. 6–8 can also be applied to the blank 19' produced as described in connection with FIGS. 1–4. The diametral shrinkage at any point along the length of the blank 19' which will occur upon firing can be determined from Curve A, and the blank 19' can be so contoured that, after the amount of shrinkage indicated by Curve A, the fired ceramic has the contour ultimately desired. This contouring step is usually unnecessary when the blank has been prepared by the method described in connection with FIGS. 1–4 because diametral shrinkages varying by less than 1 percent can usually be disregarded in commercial practice.

It has been determined that a blank can be pressed around at least one stepped arbor provided that at least 80 percent of the compaction is in the direction of decreasing arbor diameter. Such compaction can be accomplished in generally the manner described above in connection with FIGS. 6–8, provided that a spacer of a different size is substituted for the spacer 25. Specifically, the substituted spacer should be of such length that the distance from the top thereof to the bottom of the upper platen 21 is 20 percent of the total upward movement of the plunger 13. When only 80 percent of the compaction is in the direction of decreasing arbor diameter, diametral shrinkage upon firing will exceed the 1 percent upper limit which is commercially acceptable; consequently, the pressed blank, prior to firing, must be contoured as described above to compensate for variations in diametral shrinkage.

What I claim is:

1. In a method for producing a ceramic insulator having a length-to-diameter ratio greater than 3:1 and at least two bores extending generally longitudinally of the insulator, said method comprising charging ceramic batch into a longitudinally extending die with stepped arbors supported therein by a plunger to form each of the bores, pressing the batch in the die between the arbor plunger and an opposing plunger, ejecting the blank and removing the arbors therefrom, contouring the blank to desired shape, and firing the contoured blank, the improvement of controlling the relative motion of the opposing plungers with respect to the longitudinal wall of the die while pressing the blank so that at least 80 percent of the total plunger movement is in the direction of decreasing arbor diameter whereby variations in the end-to-end density of the insulator are minimized.

2. In a method as claimed in claim 1, the improvement wherein from 80 percent to 90 percent of the plunger movement is in the recited direction, the longitudinal surface of the blank prior to firing is contoured generally as a solid of revolution about its longitudinal axis and the transverse diameter along the longitudinal surface of the blank is controlled so that it is greater than that desired after firing by a percentage which varies as an inverse function of the green, or unfired end-to-end density.

3. In a method as claimed in claim 1, the improvement wherein the said ceramic insulator has a length-to-diameter ratio not greater than 8:1.

4. In a method for producing a ceramic insulator having a length-to-diameter ratio greater than 3:1 and at least two bores extending generally longitudinally of the insulator, said method comprising charging ceramic batch into a longitudinally extending die with arbors supported therein by a plunger to form each of the bores, pressing the batch between opposing plungers, ejecting the blank, contouring it to the desired shape, and firing the contoured blank, the improvement wherein the longitudinal surface of the blank prior to firing is contoured generally as a solid of revolution about its longitudinal axis and the transverse diameter along the longitudinal surface of the blank is controlled so that it is greater than that desired after firing by a percentage which varies as an inverse function of the green or unfired end-to-end density.

* * * * *